(12) United States Patent
Kitani et al.

(10) Patent No.: US 8,201,221 B2
(45) Date of Patent: Jun. 12, 2012

(54) DATA TRANSMISSION CONTROL ON NETWORK

(75) Inventors: Makoto Kitani, Yokohama (JP);
Takahisa Miyamoto, Yokohama (JP)

(73) Assignee: ALAXALA Networks Corporation, Kanagawa (JP)

( * ) Notice: Subject to any disclaimer, the term of this patent is extended or adjusted under 35 U.S.C. 154(b) by 1002 days.

(21) Appl. No.: 11/366,587

(22) Filed: Mar. 3, 2006

(65) Prior Publication Data
US 2007/0011262 A1 Jan. 11, 2007

(30) Foreign Application Priority Data
Jun. 21, 2005 (JP) .................................. 2005-180056

(51) Int. Cl.
*H04L 29/06* (2006.01)
(52) U.S. Cl. .................. 726/4; 726/21; 726/28; 726/29; 713/155
(58) Field of Classification Search ................ 726/4, 21, 726/28–30; 713/156, 165, 150, 155; 709/225, 709/226, 229
See application file for complete search history.

(56) References Cited

U.S. PATENT DOCUMENTS

| | | | | |
|---|---|---|---|---|
| 6,463,474 | B1 * | 10/2002 | Fuh et al. ....................... | 709/225 |
| 6,470,453 | B1 * | 10/2002 | Vilhuber ............................ | 726/4 |
| 6,765,906 | B1 * | 7/2004 | Suzuki .......................... | 370/389 |
| 7,231,517 | B1 * | 6/2007 | Mashayekhi ................. | 713/167 |
| 2003/0225893 | A1 * | 12/2003 | Roese et al. ................... | 709/227 |
| 2004/0010701 | A1 * | 1/2004 | Vollbrecht et al. ............. | 713/201 |
| 2004/0103275 | A1 * | 5/2004 | Ji et al. .......................... | 713/150 |
| 2004/0122960 | A1 * | 6/2004 | Hall et al. ...................... | 709/229 |
| 2005/0050352 | A1 * | 3/2005 | Narayanaswami et al. ... | 713/201 |
| 2005/0066061 | A1 * | 3/2005 | Graves et al. ................. | 709/249 |
| 2005/0125692 | A1 * | 6/2005 | Cox et al. ....................... | 713/201 |
| 2006/0182119 | A1 * | 8/2006 | Li et al. ..................... | 370/395.52 |

FOREIGN PATENT DOCUMENTS
JP 11-308272 11/1999
(Continued)

OTHER PUBLICATIONS
Port-Based Network Access Control, IEEE Standard Jun. 14, 2001.*
(Continued)

*Primary Examiner* — Taghi Arani
*Assistant Examiner* — Justin T Darrow
(74) *Attorney, Agent, or Firm* — Antonelli, Terry, Stout & Kraus, LLP.

(57) ABSTRACT

Enables control of data transmission within a network. For this, for example, a network relay apparatus makes a determination as to permission to transmit data, based on a condition relating to at least one of the transmission origin of the data and transmission destination of the data. An administration unit contains administration information indicating permission to use shared devices by users of clients. The connection relay apparatus for a target client acquires user identifying information from the target client. The administration unit acquires the user identifying information from the connection relay apparatus for a target client, and referring to the administration information, detects a target shared device that is one of the shared device permission to use of which has been granted to a user of the target client. The administration unit notifies the connection relay apparatus for the target shared device of permission for transfer of data between the target client and the target shared device, together with information identifying the target client. Upon receiving the notification, the connection relay apparatus for the target shared device sets the condition so as to change the data transmission permission between the target client and the target shared device from not authorized to authorized.

18 Claims, 14 Drawing Sheets

FOREIGN PATENT DOCUMENTS

| | | |
|---|---|---|
| JP | 2003-242109 | 8/2003 |
| JP | 2004-207783 | 7/2004 |
| WO | WO 2004064325 A1 * | 7/2004 |

OTHER PUBLICATIONS

Brawn, S.K. et al. Staying Secure in an Insecure World: 802.1x Secure Wireless Computer Connectivity for Students, Faculty, and Staff to the Campus Network. User Services Conference Proceedings of the 32nd Annual ACM SIGUCCS Conference on User Services (Oct. 2004), pp. 273-277 [online], [retrieved on May 7, 2009] <http://portal.acm.org>.*

LAN Access Security Interoperability Lab, What is 802.1X (Mar. 2005).

"Controlling Access From Outside As Well As From Inside", with partial English translation, p. 62, lines 10-18 (Feb. 1, 2002).

* cited by examiner

PERMISSION INFORMATION ~129

| TRANSMISSION ORIGIN || TRANSMISSION DESTINATION ||
|---|---|---|---|
| IDENTIFYING INFORMATION | IP ADDRESS | IDENTIFYING INFORMATION | IP ADDRESS |
| 00:00:00:00:00:1 | 192.168.3.10 | 00:00:00:00:00:50 | 192.168.3.16 | o
o
o

Fig.5

USER ATTRIBUTE INFORMATION ~337

| USER | GROUP | USEABLE SHARED DEVICES | IDENTIFYING INFORMATION | IP ADDRESS | NETWORK RELAY APPARATUS | USAGE STATUS |
|---|---|---|---|---|---|---|
| USERh | SALES | MAIL SERVER | 00:00:00:00:00:1 | 192.168.3.10 | APPARATUS A | LOGGED IN |
| USERi | DEVELOPMENT | MAIL SERVER FILE SERVER | 00:00:00:00:00:2 | 192.168.1.2 | APPARATUS B | LOGGED OUT |
| USERj | GENERAL AFFAIRS | MAIL SERVER | 00:00:00:00:00:3 | 192.168.10.3 | APPARATUS A | LOGGED IN |
| ○○○ | | | | | | |

Fig.6

GROUP INFORMATION 338

| GROUP | USEABLE SHARED DEVICES | RELATED GROUPS | NETWORK ADDRESS | VLAN |
|---|---|---|---|---|
| SALES | PRINTER P GATEWAY | GENERAL AFFAIRS | 192.168.3/24 | 30 |
| DEVELOPMENT | PRINTER Q GATEWAY | GENERAL AFFAIRS | 192.168.1/24 | 10 |
| GENERAL AFFAIRS | PRINTER P GATEWAY | SALES, DEVELOPMENT | 192.168.10/24 | 100 | o
o
o

Fig.7

SHARED DEVICE INFORMATION 339

| SHARED DEVICE | AFFILIATED VLAN | IDENTIFYING INFORMATION | IP ADDRESS | NETWORK RELAY APPARATUS |
|---|---|---|---|---|
| FILE SERVER | — | 00:00:00:00:00:44 | 192.168.100.4 | APPARATUS X |
| MAIL SERVER | — | 00:00:00:00:00:4D | 192.168.200.13 | APPARATUS Y |
| PRINTER P | 30 | 00:00:00:00:00:50 | 192.168.3.16 | APPARATUS A |
| PRINTER Q | 10 | 00:00:00:00:00:51 | 192.168.1.17 | APPARATUS B |
| GATEWAY | — | 00:00:00:00:00:60 | 192.168.150.1 | APPARATUS Y | o
o
o

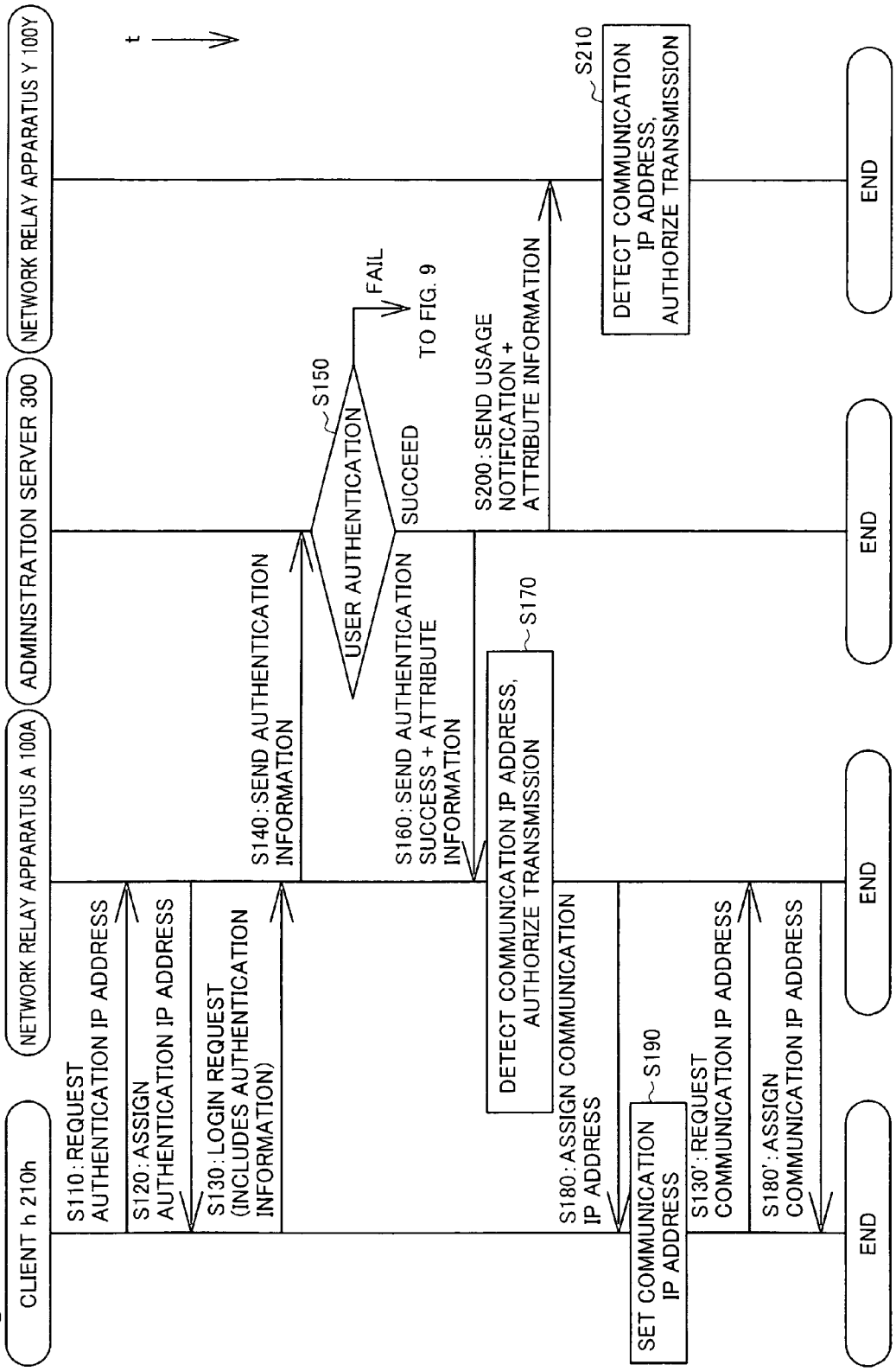

Fig.11

PERMISSION INFORMATION  ~129

| TRANSMISSION ORIGIN | | TRANSMISSION DESTINATION | |
|---|---|---|---|
| IDENTIFYING INFORMATION | IP ADDRESS | IDENTIFYING INFORMATION | IP ADDRESS |
| 00:00:00:00:00:1 | 192.168.3.10 | any | any | o
o
o

Fig.12

PERMISSION INFORMATION  ~129

| TRANSMISSION ORIGIN | | TRANSMISSION DESTINATION | |
|---|---|---|---|
| IDENTIFYING INFORMATION | IP ADDRESS | IDENTIFYING INFORMATION | IP ADDRESS |
| any | 192.168.3.10 | any | 192.168.200.13 | o
o
o

DATA TRANSMISSION CONTROL ON NETWORK

CROSS REFERENCE TO RELATED APPLICATIONS

The present application claims priority from Japanese patent application No. 2005-180056 filed on Jun. 21, 2005, the content of which is hereby incorporated by reference into this application.

BACKGROUND

The technical field relates to control of data transmission on a network.

The importance of security measures on networks such as LANs (Local Area Networks) has grown in recent years. Firewalls are one kind of security measure deployed on networks. A firewall is typically located at the boundary of an internal network (e.g. a LAN) and an external network (e.g. the Internet), and is utilized to block unauthorized data transmission between the external network and the internal network.

In some instances, a firewall is installed on a client within the network. In such instances, the firewall is able within the network to block unauthorized data transmission between the client and other devices within the network.

Another network security measure is technology using the IEEE 802.1x standard, which is one of the standards of the IEEE (US Institute of Electrical and Electronics Engineers). Using IEEE 802.1x technology, it is possible to perform user authentication of a client before the client is able to use the network, and to permit use of the network only by clients that have been successfully authenticated.

SUMMARY

When building or operating a network, it is sometimes necessary to control data transmission within the network. For example, there are instances in which it is desirable to assign different permissions depending on the user of a client, either allowing or denying use of a shared device such as a server or printer within the network, so as to prevent data transmission between a client and a shared device which the user of the client does not have permission to use.

Building and operation of such a network is difficult to achieve with the conventional technologies discussed above. Specifically, with technologies that involve a firewall situated at the boundary of an internal network and an external network, it is difficult to control data transmission within the network per se.

With technologies that involve installing a firewall on a client within a network, there exists a possibility that a user could improperly change the firewall settings by operating the client. Consequently, it is difficult to effectively ensure control of data transmission between the client and other devices on the network.

With IEEE 802.1x technology on the other hand, it is difficult, once a client has been authenticated and allowed use of the network, to carry out control of data transmission between the client and other devices on the network.

Accordingly, technology which would enable data transmission control within a network was contemplated.

In one aspect of the present invention, there is provided a method for controlling data transmission between a shared device and a target client in a network having: at least one client, one of the client being the target client; at least one shared device; at least one network relay apparatus that connects the client with the shared device via a link and determines transmission permission for input data based on a condition relating to at least one of a transmission origin of the data and a transmission destination of the data; and an administration unit that contains administration information indicating permission to use the shared device by a user of the client. The method comprises the steps of (a) user identification information that identifies a user of the target client being acquired from the target client by a client connection relay apparatus that is the network relay apparatus inputs all data originating from the target client; (b) the administration unit acquiring the user identification information from the client connection relay apparatus; (c) the administration unit, referring to the user identification information, detecting a target shared device that is one of the shared device permission to use of which has been granted to a user of the target client identified based on the acquired user identification information; (d) the administration unit notifying a shared device connection relay apparatus of permission to transmit data between the target client and the target shared device, together with information identifying the target client, the shared device connection relay apparatus being the network relay apparatus inputs all data destined for the target shared device; and (e) the shared device connection relay apparatus, upon receipt of the notification in the step (d), setting the condition so as to change the data transmission permission between the target client and the target shared device from not authorized to authorized.

With this method, the client connection relay apparatus acquires user identifying information from the target client. The administration unit, referring to the user identifying information, detects a target shared device that is one of the shared device permission to use of which has been granted to a user of the target client and notifies the shared device connection relay apparatus of permission to transmit data between the target client and the target shared device. The shared device connection relay apparatus, upon receipt of the notification, set the condition so as to change the data transmission permission between the target client and the target shared device from not authorized to authorized. Accordingly, with this method, data transmission control within the network, namely, control of permission for data transfer between a client and a shared device depending on a user of the client, can be carried out.

Additionally, with this method, since permission for data transfer between a client and a shared device depending on a user of the client is determined in a shared device connection relay apparatus, the load of determining data transfer permissions can be distributed.

In this method, the user identification information may include authentication information for use in authenticating a user of the target client. The method may further comprise the step of (f) the administration unit performing authentication of a user of the target client based on the authentication information. The step (d) may be executed when the authentication in the step (f) is succeeded.

According to this arrangement, unauthorized access to the network through "spoofing" with a fraudulent user name can be restricted.

The above method may further comprise the steps of: (g) in the event of successful authentication in the step (f), the administration unit notifying the client connection relay apparatus of success of the authentication; and (h) upon receiving notification in the step (g), the client connection relay apparatus setting the condition so as to change from not authorized to authorized the transmission permission for data sent from the target client.

With this arrangement, network security can be enhanced further by restricting the range that can be used by an unauthenticated user.

The above method may further comprise the steps of: (i) the client connection relay apparatus detecting suspension of use of the network by a user of the target client and notifying the administration unit of the suspension of use; (j) the administration unit, upon receipt of notification in the step (i), notifying the shared device connection relay apparatus of the suspension of use; and (k) the shared device connection relay apparatus, upon receipt of notification in the step (j), setting the condition so as to change from authorized to not authorized the permission for transmitting data between the target client and the target shared device.

With this arrangement, it is possible to restrict unauthorized access to a shared device through spoofing or the like when use of the network by a user has been suspended.

The above method may further comprise the step of (l) upon detection of the suspension of use, the client connection relay apparatus setting the condition so as to change from authorized to not authorized the permission for transmitting data sent from the target client.

In the above method, the step (i) may be a step wherein the client connection relay apparatus detects the suspension of use in at least one instance selected from: receipt from the target client of a request for suspending use of the network; and failure to receive within a prescribed time interval from the target client a request for continued use of the network.

In the above method, the client connection relay apparatus may be the network relay apparatus one hop away from the target client, and the shared device connection relay apparatus may be the network relay apparatus one hop away from the target shared device.

With this arrangement, the range useable by an unauthenticated user may be restricted to a minimum, so that network security can be enhanced further. Also, with this arrangement, by carrying out the transmission permission determination on a minimum of data only, it becomes possible to control permission for data transmission between a client and a shared device, while reducing the load of data transfer determinations.

These and other objects, means, and effects of the invention will be apparent from the following description of the embodiments.

The present invention can be realized in a various aspects. For example, the present invention can be realized in aspects such as a data transmission control method in a network, a network deployable administration apparatus and network relay apparatus, a network system, a computer program for accomplishing the functions of these methods or apparatus, a recording medium having such a computer program recorded thereon, a data signal containing such a computer program and embodied in a carrier wave or the like.

BRIEF DESCRIPTION OF THE DRAWINGS

FIG. 5 is an illustration of exemplary content of the user attribute information 337;

FIG. 6 is an illustration of exemplary content of the group information 338;

FIG. 7 is an illustration of exemplary content of the shared device information 339;

FIG. 8 is a flowchart showing the flow of the login process in the network system 10 of the embodiment;

FIG. 11 is an illustration of exemplary content of the updated permission information 129 of the network relay apparatus 100A;

FIG. 12 is an illustration of exemplary content of the updated permission information 129 of a network relay apparatus 100Y;

DESCRIPTION OF THE PREFERRED EMBODIMENT

An example of a preferred embodiment of the present invention will be described in the following order. The invention is not limited to this embodiment.

A. Embodiment
B. Variations
A. Embodiment

Figure 1:
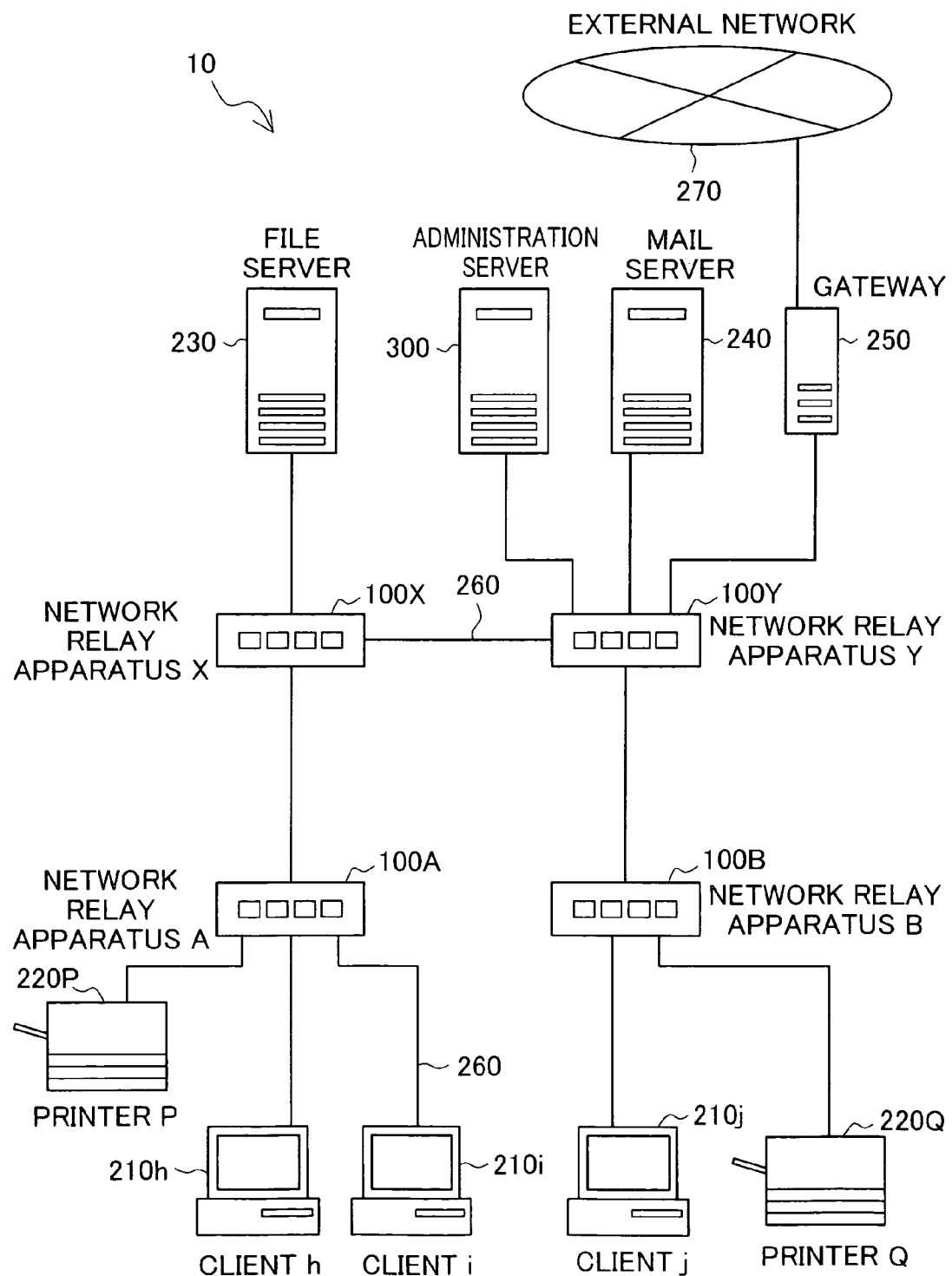
FIG. 1 is a diagram showing a configuration of a network system in the embodiment.

FIG. 1 is a diagram showing a configuration of a network system in the embodiment. The network system 10 in the embodiment has a configuration where multiple devices are connected by multiple network relay apparatus 100 and links 260. The links 260 are data transmission paths, and are composed of UTP cable, STP cable, optical fiber, or coaxial cable, or wirelessly. The network relay apparatus 100 are apparatus for relaying data transferred within the links 260 of the network system 10, and are composed of switching hubs, routers, access points, or the like. Data transmission within the network system 10 is carried out in accordance with a prescribed protocol, for example, the TCP/IP protocol. In the embodiment, apparatus that relay data in Third Layer (Layer 3) of the OSI Reference Model are used as the network relay apparatus 100. Data transferred within the network system 10 takes the form of packets in the embodiment.

Herein, where a plural number of constituent elements of the same kind are present within the network system 10, an identifying symbol for identifying each individual constituent element is appended after the symbol indicating the constituent element per se. For example, since four network relay apparatus 100 are present within the network system 10 in the embodiment, these are denoted respectively as network relay apparatus 100A, 100B, 100X, and 100Y. However, when there is no particular need to distinguish among individual constituent elements, the elements will be denoted without the aforementioned identifying symbol at the end. Additionally, constituent elements are sometimes denoted by the aforementioned identifying symbol appended to the name of the element. For example, the network relay apparatus 100A is sometimes denoted as the network relay apparatus A.

A gateway 250 is connected to the network relay apparatus 100Y. The network system 10 is connected via the gateway 250 to an external network 270. The gateway 250 may include firewall functionality. Also connected to the network relay apparatus 100Y are a mail server 240 and an administration server 300. A file server 230 is connected to the network relay apparatus 100X. To the network relay apparatus 100A are connected clients 210 (210*h* and 210*i*) for use by users, and a printer 220 (220P). To the network relay apparatus 100B are connected a client 210 (210*j*) and a printer 220 (220Q). The gateway 250, mail server 240, file server 230, and printers 220 are devices that are used by the plurality of clients 210; herein, these devices are termed "shared devices."

Each client 210 and shared device within the network system 10 has a network interface (not shown), and is connected to a link 260 via its network interface.

Herein, a network relay apparatus 100 to which all packets originating with a given client 210 are input is termed the "connection network relay apparatus" of that client 210. For example, since all packets originating with the client 210*h* are input to the network relay apparatus 100A, the network relay apparatus 100A constitutes the connected network relay apparatus for the client 210*h*. Typically, the connection network relay apparatus for a given client 210 is the network relay apparatus 100 one hop away from (first destination of) the client 210, i.e., the network relay apparatus 100 directly connected to the client 210 in question.

Similarly, a network relay apparatus 100 to which all packets destined for a given shared device are input is herein termed the "connection network relay apparatus" of that shared device. For example, the connection network relay apparatus for the mail server 240 is the network relay apparatus 100Y. Typically, the connection network relay apparatus for a shared device will be the network relay apparatus 100 one hop away from the shared device, i.e. the network relay apparatus 100 directly connected to the shared device in question.

Figure 2:
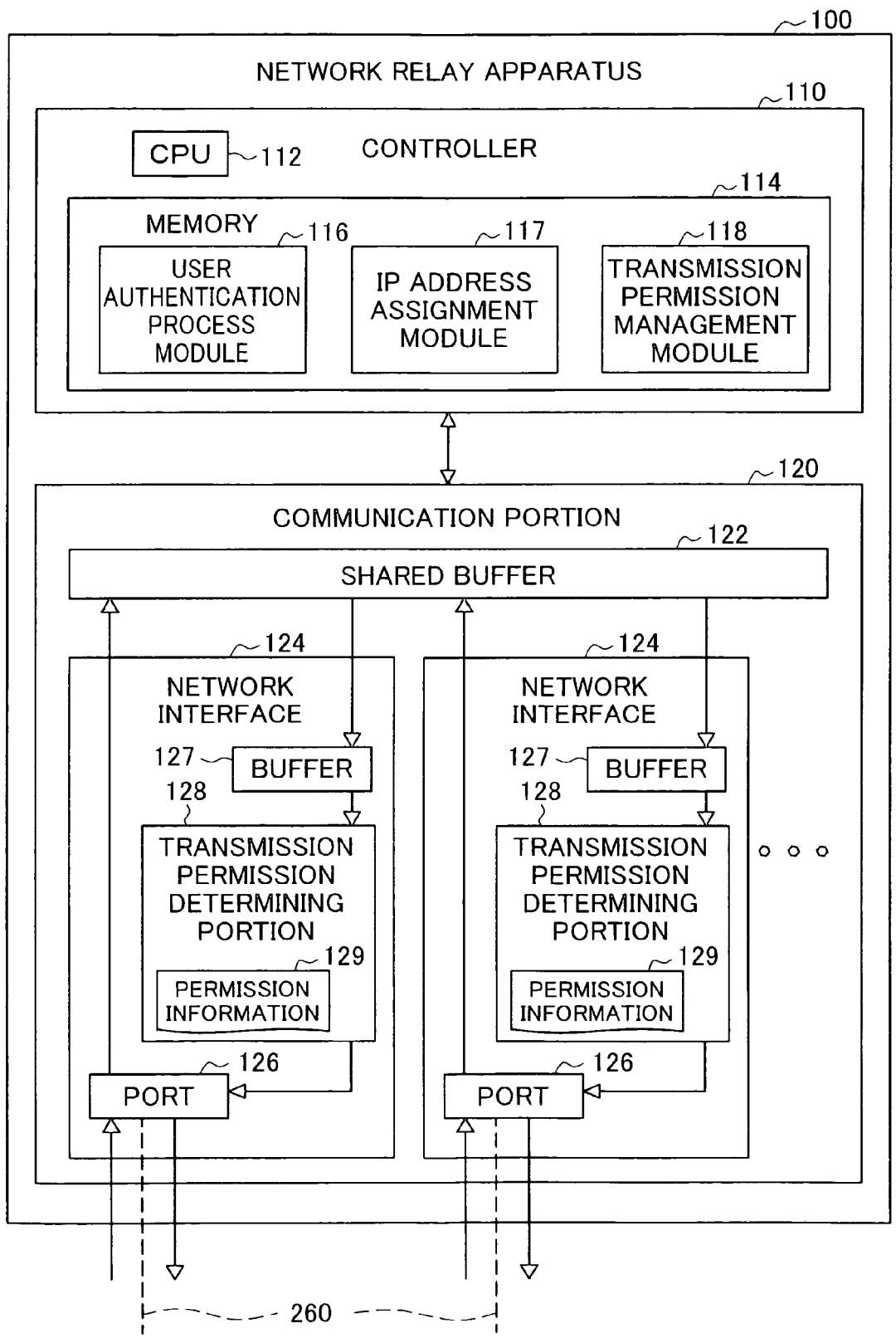
FIG. 2 is a diagram showing a configuration of a network relay apparatus 100.

FIG. 2 is a diagram showing a configuration of a network relay apparatus 100 (FIG. 1). This network relay apparatus 100 has a communication portion 120 for transmitting packets via a link 260 (FIG. 1), and a controller 110 for controlling packet transmission in the communication portion 120.

The controller 110 includes a CPU 112 and memory 114. Within the memory 114 is stored computer programs for accomplishing the functions of a user authentication process module 116, an IP address assignment module 117, and a transmission permission management module 118. The user authentication process module 116, IP address assignment module 117, and transmission permission management module 118 are computer programs for executing the login process and logout process described later. By reading out and executing these computer programs, the CPU 112 accomplishes the functions of the modules mentioned above. Alternatively, the controller 110 may be furnished with a memory area in addition to the memory 114, and the aforementioned computer programs may be stored in this memory area.

The communication portion 120 includes a plurality of network interfaces 124 and a shared buffer 122 shared by the multiple network interfaces 124. While two network interfaces 124 are shown in FIG. 2, the communication portion 120 may include three or more network interfaces 124. A network interface 124 includes a port 126 connecting with a link 260; a buffer 127 for temporary storage of packets sent from the shared buffer 122; and a transmission permission determining portion 128 for determining transmission permissions for packets stored in the buffer 127. The transmission permission determining portion 128 includes permission information 129.

Figures 3, 4:
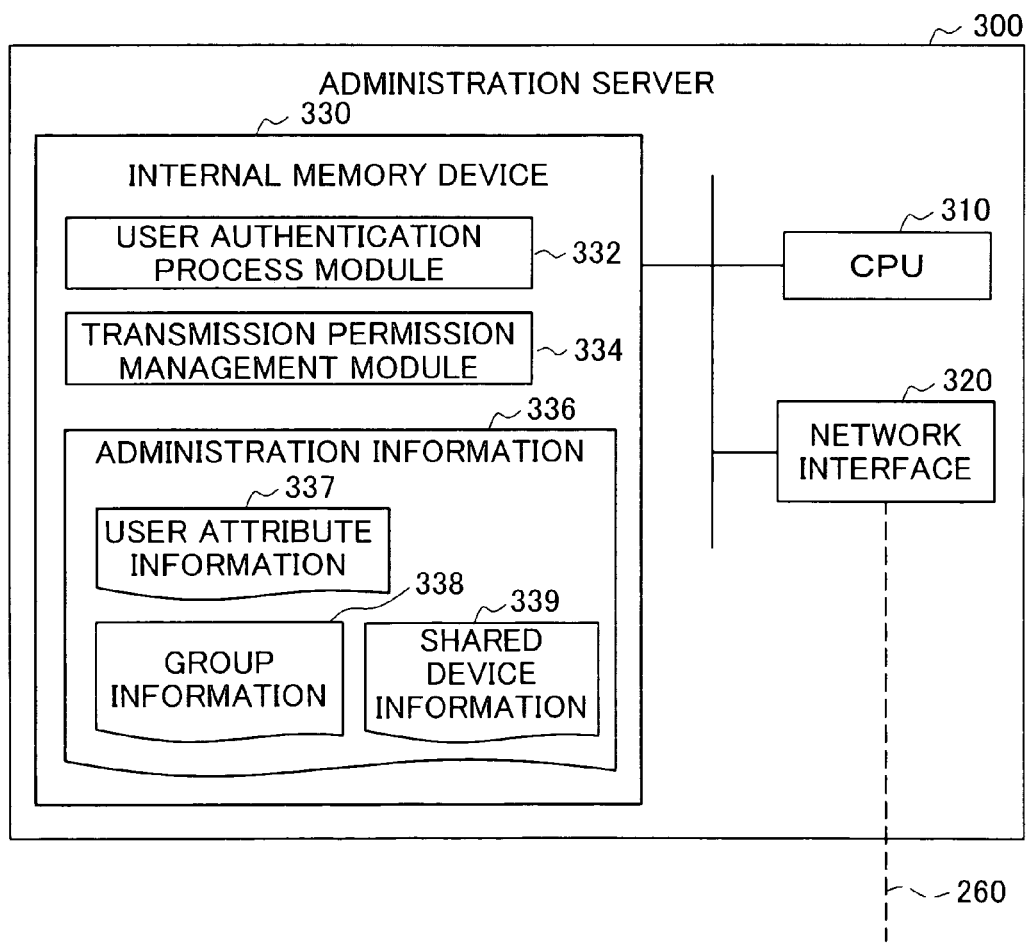
FIG. 3 is an illustration of exemplary content of permission information 129.
FIG. 4 is a diagram showing a configuration of an administration server 300.

FIG. 3 is an illustration of exemplary content of permission information 129 (FIG. 2). Permission information 129 is information that indicates a condition for authorizing transmission of packets input to a network relay apparatus 100. As shown in FIG. 3, a condition for authorizing packet transmission is expressed in terms of a combination of a packet transmission origin and a packet transmission destination. In the embodiment, a packet transmission origin and a packet transmission destination are identified using identifying information identifying a network interface of a client 210 or a shared device (e.g. a MAC address) and an IP address.

A packet input from a link 260 to one network interface 124 of the communication portion 120 of a network relay apparatus 100 (FIG. 2) is sent to the shared buffer 122 through the port 126, and stored in the shared buffer 122. Subsequently, the packet is transferred to the buffer 127 of another network interface 124 connected to the link 260 leading to the transmission destination for the packet.

Once the packet is transferred to the buffer 127, determination of transmission permission is carried out by the transmission permission determining portion 128 of the network interface 124 on the packet exit end. The transmission permission determining portion 128, in the event that the packet transmission origin and packet transmission destination match the permission condition indicated in the permission information 129 (FIG. 3), decides that transmission is authorized, or if they do not match decides that transmission is not authorized. Packets determined to be authorized are sent to the link 260 via the port 126. On the other hand, packets determined not to be authorized are discarded. In this way, in the network relay apparatus 100 of the embodiment, transmission permissions are determined in the transmission permission determining portion 128 of the network interface 124 on the packet exit end.

It is not necessary for packet transmission permission determination to be carried out in all of the network interfaces 124 within a network relay apparatus 100. Specifically, in the network relay apparatus 100 according to the embodiment, network interfaces 124 can be set to perform packet transmission permission determinations, with reference to their connection destination.

FIG. 4 is a diagram showing a configuration of an administration server 300 (FIG. 1). The administration server 300 has a CPU 310, a network interface 320, and an internal memory device 330. A link 260 is connected to the network interface 320.

Within the internal memory device 330 are stored computer programs for accomplishing the functions of a user authentication process module 332 and a transmission permission management module 334. The user authentication process module 332 and the Transmission permission management module 334 are computer programs for executing the login process and logout process, to be described later. The CPU 310 accomplishes the functions of the modules mentioned above by reading out and executing these computer programs.

Administration information 336 is also stored in the internal memory device 330. Administration information 336 is information for administering the status of clients 210 and shared devices within the network system 10, and includes user attribute information 337, group information 338, and shared device information 339.

FIG. 5 is an illustration of exemplary content of the user attribute information 337 (FIG. 4). As shown in FIG. 5, the user attribute information 337 indicates user name, group to which the user belongs, shared devices which the user has permission to use, identifying information (e.g. MAC address) and IP address of the client 210 used by the user, the connection network relay apparatus 100 for the client 210, and the network system 10 usage status by the user. For example, in the example shown in FIG. 5, it is apparent from the attribute information 337 that a user h (the user of client 210*h* (FIG. 1)) belongs to the Sales group and has permission to use the mail server 240 (FIG. 1); that the identifying information of the client 210*h* is "00:00:00:00:00:1" and its IP address is "192.168.3.10"; that the connection network relay apparatus 100 for the client 210*h* is the network relay apparatus 100A; and that user h is currently logged onto the network system 10.

FIG. 6 is an illustration of exemplary content of the group information 338 (FIG. 4). As shown in FIG. 6, the group information 338 indicates group name, shared devices which users belonging to the group have permission to use, other groups related to the group, the network address of the group, and the number of the VLAN (Virtual LAN) used by the group. For example, in the example shown in FIG. 6, it is apparent from the group information 338 that users belonging to the Sales group have permission to use the printer 220P (FIG. 1) and the gateway 250; the Sales group is related to the General Affairs group; the network address of the Sales group is "192.168.3/24", and the number of the VLAN used by the Sales group is "30."

FIG. 7 is an illustration of exemplary content of the shared device information 339 (FIG. 4). As shown in FIG. 7, the shared device information 339 indicates shared device name, the number of the VLAN to which the shared device belongs, identifying information and IP address of the shared device, and the connection network relay apparatus 100 for the shared device. For example, in the example shown in FIG. 7, it is apparent from the shared device information 339 that the file server 230 (FIG. 1) has the identifying information "00:00:00:00:00:44" and the IP address "192.168.100.4"; and the connection network relay apparatus 100 is the network relay apparatus 100X (FIG. 1).

Some of the administration information 336 (FIG. 4) belonging to the administration server 300 is set/updated by an administrator. The administrator, by operating an input portion (not shown) provided to the administration server 300 (FIG. 4), can set the user attribute information 337 (FIG. 5) by inputting the groups to which users belong, and the shared devices they have permission to use. Also, some of the administration information 336 (e.g. the usage status field) are set/updated by the administration server 300 during the login process and logout process, described later.

Figure 9:
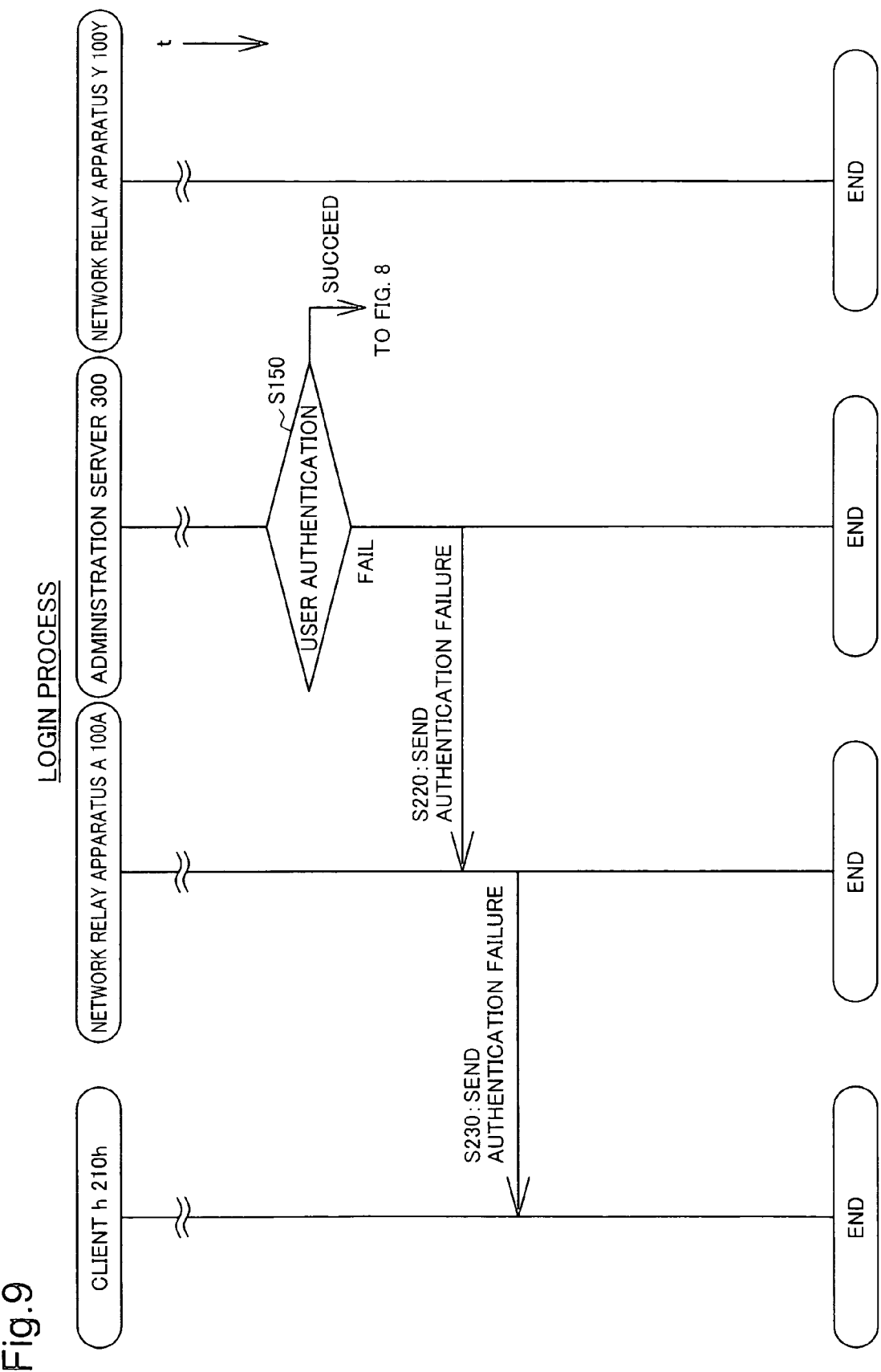
FIG. 9 is a flowchart showing the flow of the login process in the network system 10 of the embodiment.

FIG. 8 and FIG. 9 are flowcharts showing the flow of the login process in the network system 10 of the embodiment. The login process is a process for initiating use of the network system 10 by a user using a client 210. The following description takes the example of the login process when initiating use of the network system 10 by the user h using the client 210*h* (FIG. 1).

Figure 10:
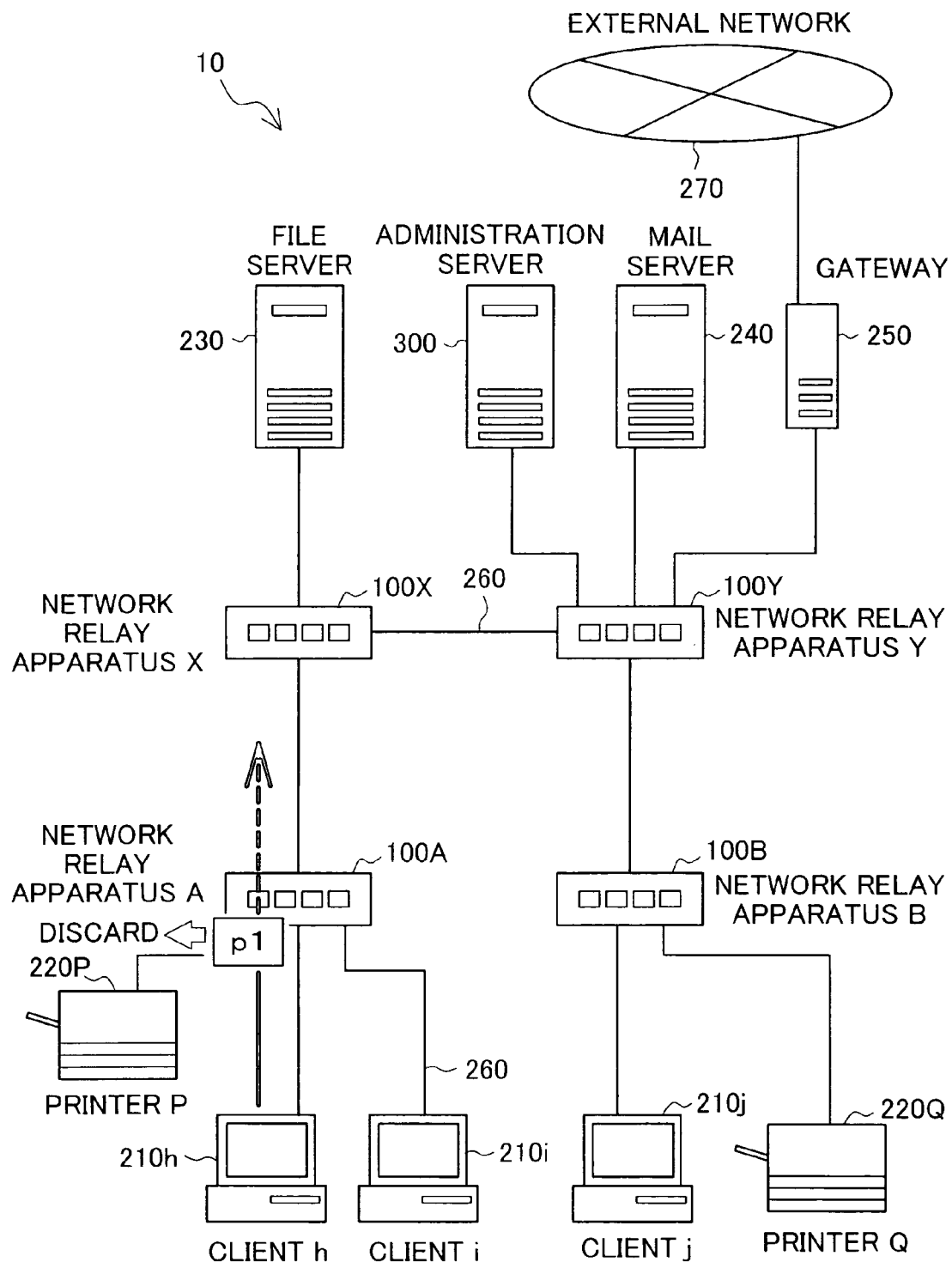
FIG. 10 is a conceptual diagram showing an example of packet flow in the logged out state.

In the initial state prior to user h initiating the login process (hereinafter termed the "logged out state"), the network relay apparatus 100A (FIG. 1), which is the connection network relay apparatus for the client 210*h*, is set so as to deny transmission of packets originating from clients 210 for which user authentication (described later) has not been successful, except in the case of the exception discussed later. Accordingly, in the logged out state, transmission of a packet from the client 210*h* is denied in the network relay apparatus 100A, and the packet is discarded. FIG. 10 is a conceptual diagram showing an example of packet flow in the logged out state. As shown in FIG. 10, in the logged out state, transmission of a packet p1 from the client 210*h* destined for the network system 10 beyond the network relay apparatus 100A is denied in the network relay apparatus 100A, and the packet p1 is discarded.

In Step S110 of the login process (FIG. 8), the client 210*h* requests the network relay apparatus 100A (FIG. 1), which is the connection network relay apparatus for the client 210*h*, for an authentication IP address (an IP address for use in authentication). As noted, the network relay apparatus 100A in the logged out state is set so that transmission of packets originating from the client 210*h* is denied; however, the network relay apparatus 100A is set so as to process packets for which it is the addressee or sender. Accordingly, the request for an authentication IP address sent from the client 210*h* is received by the network relay apparatus 100A. In Step S120, the IP address assignment module 117 (FIG. 2) of the network relay apparatus 100A receiving the request for authentication IP address assigns an authentication IP address to the client 210*h*. The authentication IP address is an IP address only used for the client 210 to transmit to the network relay apparatus 100A packets required for user authentication, described later. Thus, even if the client 210*h*, using the authentication IP address, sends a packet destined for the network system 10 beyond the network relay apparatus 100A, the sent packet will be discarded in the network relay apparatus 100A.

In Step S130 (FIG. 8), the client 210 establishes the assigned authentication IP address and, using the authentication IP address, sends a login request to the network relay apparatus 100A. In the embodiment, the login request contains identifying information for the client 210*h* (see FIG. 5) and authentication information. The authentication information is information used for user authentication, described later, and includes prescribed content depending on the user authentication format employed.

In Step S140 (FIG. 8), the user authentication process module 116 (FIG. 2) of the network relay apparatus 100A sends the received authentication information to the administration server 300, in the form of a packet originating from the network relay apparatus 100A itself. In the event that identifying information is also used for user authentication, the user authentication process module 116 also sends the received identifying information to the administration server 300.

In Step S150 (FIG. 8), the user authentication process module 332 (FIG. 4) of the administration server 300 performs user authentication on the basis of the receive(1 authentication information. User authentication is executed, for example, by a known user authentication format such as an authentication format using an ID and password, or an authentication format using a digital signature. Depending on the authentication format used for user authentication, exchange of information between the client 210*h* and the administration server 300 (via the network relay apparatus 100A) may be executed multiple times. In the event that user authentication in Step S150 is successful, the transmission permission management module 334 (FIG. 4) of the administration server 300 updates the usage status field in the user attribute information 337 (FIG. 5) to "logged in." The transmission permission management module 334 also makes any necessary settings/updates to the identifying information field, IP address field, and network relay apparatus field in the user attribute information 337. For example, during the first login process by the user h, with reference to the group information 338 (FIG. 6), a communication IP address may be assigned on the basis of the network address of the group to which user h belongs (the Sales group). The process then proceeds to Steps S160 and S200. On the other hand, if user authentication in Step S150 fails, the process proceeds to Step S220 of FIG. 9.

In Step S160 (FIG. 8), the transmission permission management module 334 (FIG. 4) of the administration server 300 sends to the network relay apparatus 100A, which is the connection network relay apparatus for the client 210h, notification of successful authentication and the user attribute information 337 (FIG. 5) relating to the successfully authenticated user h.

In Step S170, the transmission permission management module 118 (FIG. 2) of the network relay apparatus 100A detects the communication IP address of the user h, on the basis of the received user attribute information 337. The communication IP address is the IP address used by the user h within the network system 10 after successful authentication. The transmission permission management module 118 detects IP address included in the user attribute information 337 (FIG. 5) as the communication IP address. In the event that the received user attribute information 337 does not contain IP address information, the transmission permission management module 118 may again ask the administration server 300 for the IP address of the user h. The communication IP address may be the same as the IP address used as the authentication IP address by the user h.

In Step S170, the transmission permission management module 118 (FIG. 2) of the network relay apparatus 100A also makes settings to the communication portion 120 so as to authorize packet transmission originating from user h. Specifically, the permission information 129 (FIG. 2) included in the network interface 124 connected to the network relay apparatus 100X (FIG. 1) via the link 260 is updated so as to append a permission condition authorizing packet transmission originating with the client 210h. FIG. 11 is an illustration of exemplary content of the updated permission information 129 of the network relay apparatus 100A. FIG. 11 shows the permission information 129 included in the network interface 124 connected to the network relay apparatus 100X (FIG. 1) via the link 260. As shown in FIG. 11, the updated permission information 129 includes a permission condition that authorizes packet transmission originating from the client 210h identified by the identifying information and IP address, and destined for any device on the network. Accordingly, packets sent from the client 210h to the network system 10 beyond the network relay apparatus 100A will be determined to be authorized in the network relay apparatus 100A.

In Step S180 (FIG. 8), the IP address assignment module 117 (FIG. 2) of the network relay apparatus 100A assigns a communication IP address to the client 210h. In Step S190, the client 210h makes the settings for using the assigned communication IP address.

In the embodiment, a lifetime (effective period) is established for communication IP addresses. This lifetime is assigned to the client 210h together with the communication IP address, when the communication IP address is assigned in Step S180. In the event that the client 210h desires to continue using the network system 10, prior to the point in time that the communication IP address currently in use expires, the client 210h sends to the network relay apparatus 100A a new communication IP address assignment request (Step S130'). Upon receiving this communication IP address assignment request from the client 210h, the network relay apparatus 100A reassigns the communication IP address to the client 210h (Step S180').

Meanwhile, in Step S200 (FIG. 8), the transmission permission management module 334 (FIG. 4) of the administration server 300, referring to the user attribute information 337 (FIG. 5) and the group information 338 (FIG. 6), detects shared device(s) which the user h who has been successfully authenticated in Step S150 has permission to use. The transmission permission management module 334 then transmits to the detected shared devices a usage notification and the user attribute information 337 (FIG. 5) for the successfully authenticated user h. Here, usage notification refers to notification identifying a successfully authenticated user and a shared device which the user has permission to use, and communicating permission for packet transmission between the shared device and the client 210 used by the user. In the embodiment, since the shared device which the user h has permission to use is the mail server 240 (see FIG. 5), the transmission permission management module 334 sends the above information to the connection network relay apparatus of the mail server 240, namely, the network relay apparatus 100Y (FIG. 1).

In the event that a user has permission to use multiple shared devices, the above information is sent of the connection network relay apparatus of each of these shared devices. For example, since the shared devices authorized for use by the Sales group to which user h belongs are the printer 220P and the gateway 250 (see FIG. 6), the permission management module 334 sends the above information to the connection network relay apparatus for the printer 220P and the gateway 250 (network relay apparatus 100A and network relay apparatus 100Y). The description hereinbelow focuses on the mail server 240 as the shared device authorized for use by the user h, and takes the example of processes in relation to the connection network relay apparatus of the mail server 240 (network relay apparatus 100Y). Processes in relation to connection network relay apparatus for other shared devices (the printer 220P and the gateway 250) are similar in content.

In Step S210 (FIG. 8), the transmission permission management module 118 (FIG. 2) of the network relay apparatus 100Y (FIG. 1) detects the communication IP address of the user h, on the basis of the received user attribute information 337. Detection of the communication IP address is carried out in the same way as detection of the communication IP address by the network relay apparatus 100A in Step S170 described above.

In Step S210, on the basis of the received usage notification, the transmission permission management module 118 (FIG. 2) of the network relay apparatus 100Y also makes settings to the communication portion 120 so as to grant permission for packet transmission between the mail server 240 and the client 210h used by the user h. In the embodiment, granting of permission for packet transmission between a client 210 and the mail server 240 is performed in the transmission permission determining portion 128 of the network interface 124 (FIG. 2) connected to the mail server 240 via the link 260 in the network relay apparatus 100Y. In the logged out state, the permission information 129 (FIG. 2) of the network interface 124 does not include a permission condition granting permission for packet transmission originating with the client 210h and destined for the mail server 240. Accordingly, the transmission permission management module 118 of the network relay apparatus 100Y updates the permission information 129 of the network interface 124 connected to the mail server 240 via the link 260, so as to append a permission condition granting permission packet transmission originating with the client 210h and destined for the mail server 240.

FIG. 12 is an illustration of exemplary content of the updated permission information 129 of a network relay apparatus 100Y. FIG. 12 shows the permission information 129 of the network interface 124 connected to the mail server 240 via the link 260. The updated permission information 129 shown in FIG. 12 includes a permission condition granting permission for packet transmission originating with the client 210*h* identified by an IP address and destined for the mail server 240 also identified by an IP address. Consequently, packets originating with the client 210*h* and destined for the mail server 240, input to the network relay apparatus 100Y, are granted transmission permission. In the permission information 129 of the network relay apparatus 100Y shown in FIG. 12, identifying information is not use to identify the client 210 or the shared device. This is because packet transmission between the client 210 and the shared device takes place via a network relay apparatus 100, so that in some instances the transmission origin and transmission destination cannot be identified by the identifying information.

Figure 13:
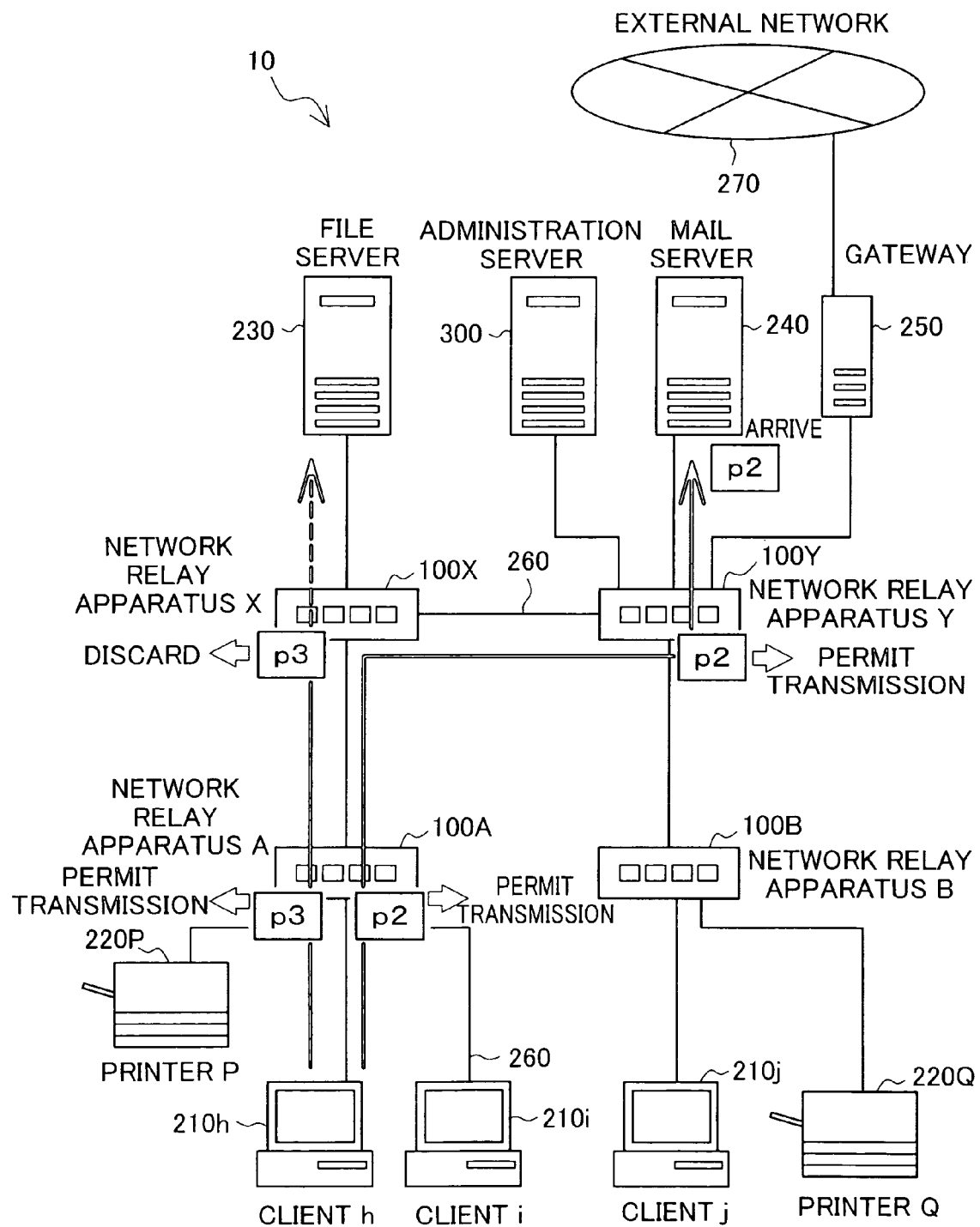
FIG. 13 is a conceptual diagram showing an example of packet flow during logged in status.

By means of the above process, the login process in the case of successful user authentication (Step S150) is completed. In the state after completion of the login process (hereinafter termed "logged in state"), packet transmission is enabled between the client 210*h* of the user h and authorized shared devices within the network system 10. FIG. 13 is a conceptual diagram showing an example of packet flow during logged in status. As shown in FIG. 13, a packet p2 sent from the client 210*h* to the mail server 240 is granted transmission permission in the network relay apparatus 100A, because the packet originates from the client 210*h*. Subsequently, the packet p2 is input to the network relay apparatus 100Y through the network relay apparatus 100X. In the network relay apparatus 100Y, the packet p2 is granted transmission permission, because the packet originates from the client 210*h* and the destination is the mail server 240. Accordingly, the packet p2 reaches the mail server 240. On the other hand, a packet p3 sent from the client 210*h* to the file server 230 (see FIG. 5), which is not a shared device that user h has permission to use, while granted transmission permission in the network relay apparatus 100A, will be denied transmission permission in the network relay apparatus 100X, because the packet originating from the client 210*h* and destined for the file server 230 does not match the permission information 129; and the packet is discarded.

As described above, in the event of user authentication failure in Step S150 (FIG. 8), the process proceeds to Step S220 in FIG. 9. In Step S220 (FIG. 9), the user authentication process module 332 (FIG. 4) of the administration server 300 sends notification of authentication failure to the network relay apparatus 100A which is the connection network relay apparatus of the client 210*h*. In Step S230, the user authentication process module 116 (FIG. 2) of the network relay apparatus 100A notifies the client 210*h* of the authentication failure. In this way, in the event of user authentication failure, the client 210*h* is not assigned a communication IP address, so the user h cannot access to the network system 10.

Figure 14:
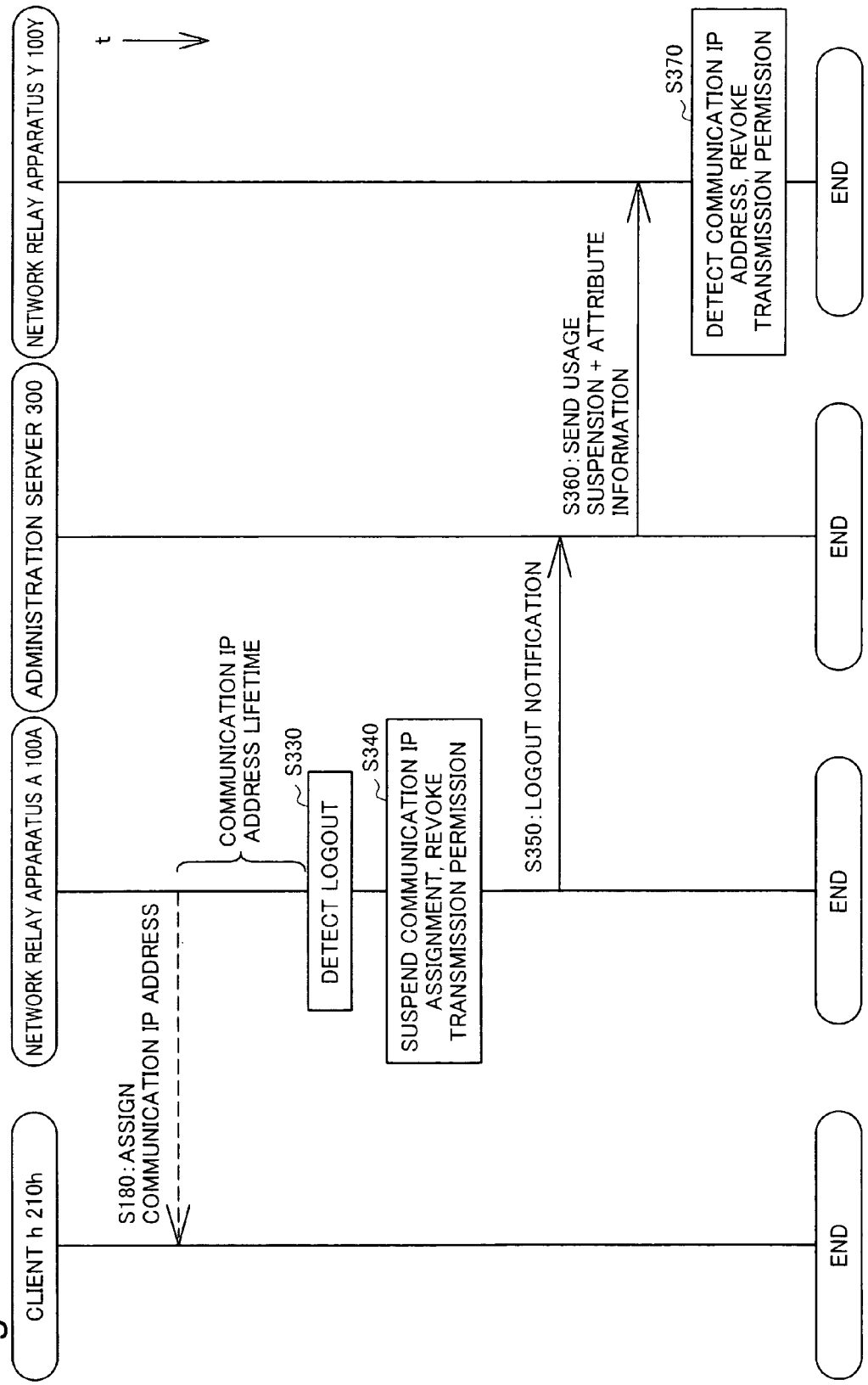
FIG. 14 is a flowchart showing the flow of the logout process in the network system 10 of the embodiment.

FIG. 14 is a flowchart showing the flow of the logout process in the network system 10 of the embodiment. The logout process is a process used to suspend use of the network system 10 by a user using a client 210. The following description takes the example of the logout process when suspend use of the network system 10 by the user h using the client 210*h* (FIG. 1).

In Step S330, the network relay apparatus 100A detects logout of the user h. In the embodiment, the network relay apparatus 100A detects logout of the user h in the event that there is no communication IP address request from the client 210*h* within the lifetime of the communication IP address. Alternatively, the network relay apparatus 100A may detect logout of the user h by receiving an explicit logout request from the client 210*h*.

In Step S340 the IP address assignment module 117 (FIG. 2) of the network relay apparatus 100A which has detected logout suspends assignment of the communication IP address to the client 210*h*. The transmission permission management module 118 (FIG. 2) of the network relay apparatus 100A makes settings to the communication portion 120 so as to revoke transmission permission for packets originating from the user h. Specifically, the permission information 129 is updated so as to delete the permission condition granting permission for transmission of packets originating from the client 210*h*, which permission was appended to the permission information (FIG. 2) in Step S170 of the login process (FIG. 8). By so doing, packets send from the client 210*h* to the network system 10 past the network relay apparatus 100A are denied transmission permission in the network relay apparatus 100A.

In Step S350, the transmission permission management module 118 (FIG. 2) of the network relay apparatus 100A notifies the administration server 300 of logout of the user h. The transmission permission management module 334 (FIG. 4) of the administration server 300 which has received notification updates the usage status field for the user h in the user attribute information 337 (FIG. 5) to "logged out."

The transmission permission management module 334 of the administration server 300 also sends the usage suspension notification and user attribute information 337 (FIG. 5) relating to user h to the connection network relay apparatus of the shared devices which user h has permission to use (Step S360). Here, usage suspension notification refers to notification identifying the user who has suspended use of the network system 10 and the shared devices which the user has permission to use, and communicating suspension of permission for packet transmission between the shared devices and the client 210 used by the user in question. In the embodiment, since the shared device which the user h has permission to use is the mail server 240 (see FIG. 5), the transmission permission management module 334 sends the above information to the network relay apparatus 100Y (FIG. 1) which is the connection network replay apparatus for the mail server 240. In the event that the user h had permission to use multiple shared devices, the above information is sent of the connection network relay apparatus of each of the shared devices. The description hereinbelow focuses on the mail server 240 as the shared device authorized for use by the user h, and takes the example of processes in relation to the connection network relay apparatus of the mail server 240 (the network relay apparatus 100Y). Processes in relation to connection network relay apparatus for other shared devices (the printer 220P and the gateway 250) are similar in content.

In Step S370, on the basis of the received user attribute information 337, the transmission permission management module 118 (FIG. 2) of the network relay apparatus 100Y detects the communication IP address of the user h. Detection of the communication IP address is carried out in the same way as detection of the communication IP address in the login process (FIG. 8) described above.

In Step S370, on the basis of the received usage suspension notification, the transmission permission management module 118 (FIG. 2) of the network relay apparatus 100Y also makes settings to the communication portion 120 so as to revoke permission for packet transmission between the mail server 240 and the client 210*h* used by the user h. Specifically, the permission information 129 is updated so as to delete the permission condition granting permission for transmission of packets originating from the client 210*h* and destined for the mail server 240, which permission was appended to the permission information (FIG. 2) in Step S210 of the login process (FIG. 8).

By means of the above process, the logout process of the user h is completed. Thus, the user h can no longer access the network system 10.

As described above, in the network system 10 (FIG. 1) of the embodiment, the administration server 300 detects shared devices which a user has permission to use, and sends usage notification to the connection network relay apparatus of each detected shared device in the login process. A network relay apparatus 100 having received usage notification updates the permission information 129 (FIG. 2) in its possession, changing it from a state in which packet transmission between the client 210 of the user and the shared device is not authorized to a state in which it is authorized. Thus, in the network system 10 of the embodiment, it is possible to carry out packet transmission control within the network system 10, namely, control of permissions for packet transmission between clients 210 and shared devices, depending on the users of the clients 210. Moreover, since permissions for packet transmission between clients 210 and shared devices are determined in the connection network relay apparatus for the shared devices, the load of determining data transfer permissions can be distributed.

Additionally, in the network system 10 of the embodiment, authentication information for use in user authentication is sent from a client 210 to the administration server 300 via the connection network relay apparatus for the client 210, and when user authentication by the administration server 300 is successful, usage notification is sent from the administration server 300 to the connection network relay apparatus. Thus, it is possible to restrict unauthorized access to the network system 10 through "spoofing" with a fraudulent user name or the like.

Further, in the network system 10 of the embodiment, when user authentication by the administration server 300 is successful, notification of successful authentication is made from the administration server 300 to the connection network relay apparatus for the client 210. The network relay apparatus 100 receiving the successful authentication notification updates the permission information 129 (FIG. 2) in its possession, changing it from a state in which packet transmission originating from the client 210 used by the user is not authorized to a state in which it is authorized. Thus, security of the network system 10 can be enhanced by restricting the range that can be used by an unauthenticated user. In the network system 10 of the embodiment, the connection network relay apparatus of a client 210 is the network relay apparatus one hop away from the client 210. Thus, security of the network system 10 can be enhanced even further by restricting to the minimum the range that can be used by an unauthenticated user.

Additionally, in the network system 10 of the embodiment, determination of permission for packet transfer between a client 210 and a shared device is carried out by the connection network relay apparatus for the shared device in question. The connection network relay apparatus for the shared device is the network relay apparatus one hop away from the shared device. Thus, transmission permission determination can be made with only a minimum of packets, whereby it is possible to control permissions for packet transmission between clients 210 and shared devices, and to reduce the load of determining data transfer permissions.

Further, in the network system 10 of the embodiment, when the connection network relay apparatus for a client 210 detects that user of the client 210 has logged out, the connection network relay apparatus notifies the administration server 300 of the logout. The administration server 300 receiving the notification detects the shared device that the user had permission to use, and sends usage suspension notification to the connection network relay apparatus of the shared device in question. The network relay apparatus 100 receiving the usage suspension notification updates the permission information 129 (FIG. 2) in its possession, changing it from a state in which packet transmission between the client 210 of the user and the shared device is authorized to a state in which it is not authorized. Thus, in the network system 10 of the embodiment, unauthorized access to shared devices through spoofing or the like can be restricted.

B. Variations

The invention is not limited to the embodiment described hereinabove, and may be reduce to practice in various other ways without departing from the scope thereof, such as the possible variations described below, for example.

B1. Variation 1

Figure 15:
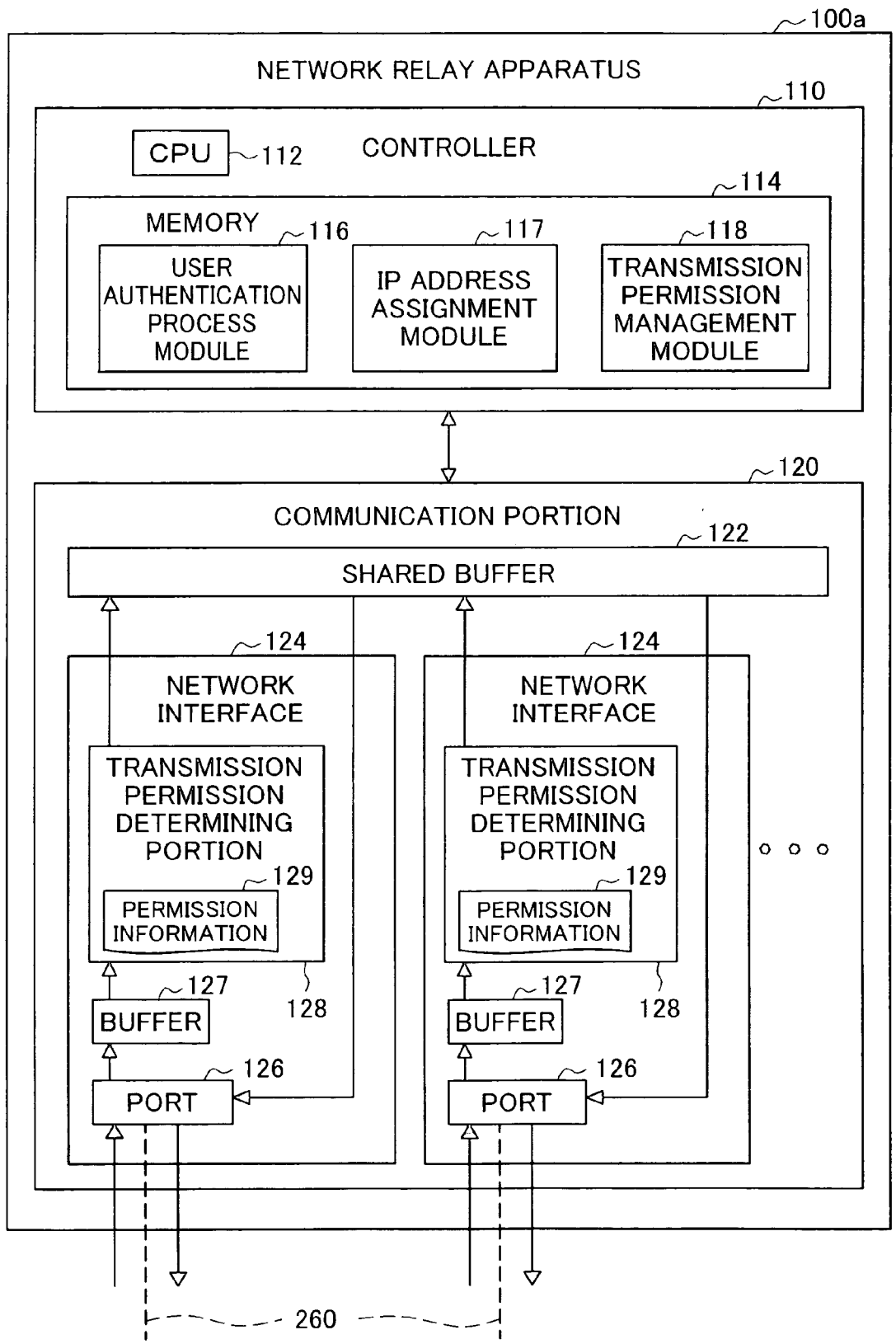
FIG. 15 is a diagram showing a configuration of a network relay apparatus 100a in a variation.

The configuration of the network relay apparatus 100 of the above-described embodiment is merely exemplary, and it is possible to employ some other configuration for the network relay apparatus 100. FIG. 15 is a diagram showing a configuration of a network relay apparatus 100*a* in a variation. The difference from the network relay apparatus 100 of the embodiment depicted in FIG. 2 in the configuration of the network interfaces 124. Specifically, in the network relay apparatus 100 of the embodiment depicted in FIG. 2, the network interfaces 124 are configured so as to enable determination of transmission permission to be carried out in the transmission permission determining portion 128 of the network interface 124 on the packet exit side. In the network relay apparatus 100*a* of the variation depicted in FIG. 15, on the other hand, the network interfaces 124 are configured so as to enable determination of transmission permission to be carried out in the transmission permission determining portion 128 of the network interface 124 on the packet entry side. The network relay apparatus 100*a* of the variation depicted in FIG. 15 can be deployed in the network system 10.

However, where the network relay apparatus 100 of the embodiment (FIG. 2) is used as the shared device connection relay apparatus, there is the advantage that the load of determining packet transmission permissions can be reduced. For example, in the case of controlling transmission of packets originating from the client 210*h* (FIG. 1) and destined for the mail server 240, where the configuration depicted in FIG. 2 is employed for the network relay apparatus 100Y (which is the connection network relay apparatus for the mail server 240), then among the network interfaces 124 of network relay apparatus 100Y it will suffice to carry out determination of packet transmission permissions only in the particular network interface 124 that is connected to the link 260 with the mail server 240. Consequently, if a packet from the client 210*h* addressed to a device other than the mail server 240 is input to the network relay apparatus 100Y, it will not be necessary to make a determination for that packet. Where the configuration depicted in FIG. 15 is employed for the network relay apparatus 100Y, on the other hand, the among the network interfaces 124 of network relay apparatus 100Y, determination of packet transmission permissions will be executed in the network interface 124 that is connected to the link 260 with the network relay apparatus 100X. Consequently, determinations must be made for all packets sent from the client 210*h* and input to the network relay apparatus 100Y. Accordingly, in this case, the load of determining packet transmission permissions can be reduced by employing the configuration of FIG. 2 of the network relay apparatus 100Y.

In the network relay apparatus 100, it may also be possible to configure the network interfaces 124 so that determination of transmission permissions can be carried out in the transmission permission determining portion 128 of the network interfaces 124 on both the packet exit side and entry side.

Figure 16:
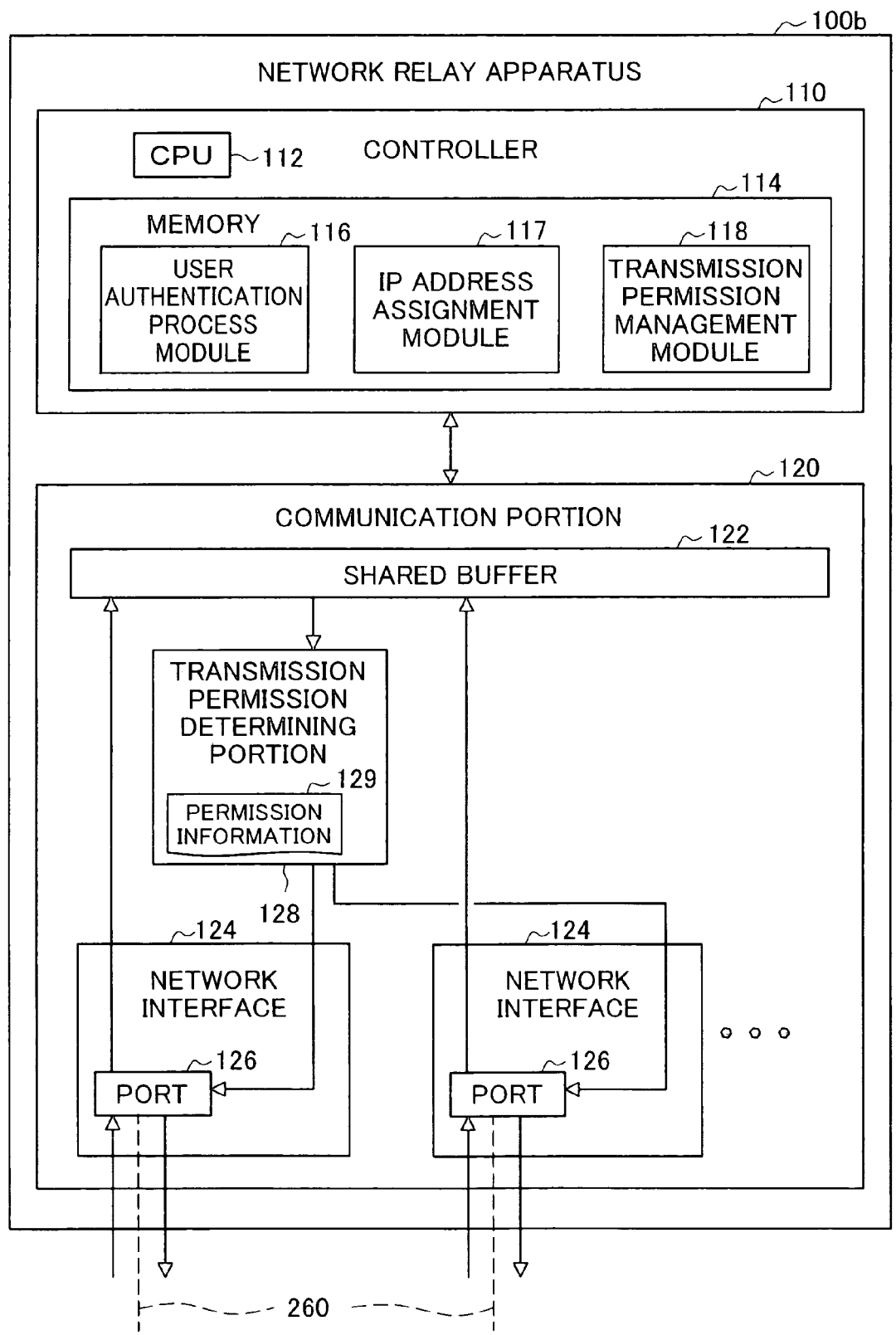
FIG. 16 is a diagram showing a configuration of a network relay apparatus 100b in another variation.

FIG. 16 is a diagram showing a configuration of a network relay apparatus 100*b* in another variation. The difference from the network relay apparatus 100 of the embodiment depicted in FIG. 2 is that in the network relay apparatus 100*b* depicted in FIG. 16, the transmission permission determining portion 128 is independent of the network interfaces 124, and is shared by the network interfaces 124. The network relay apparatus 100*b* of the variation depicted in FIG. 16 can be deployed in the network system 10.

Also, the configuration of a network relay apparatus 100 may differ depending on its placement within the network system 10. For example, a network relay apparatus 100 not having a client 210 connected to it may have a design lacking a user authentication process module 116 and an IP address assignment module 117. A network relay apparatus 100 having neither a client 210 nor a shared device connected to it may have a design lacking a transmission permission management module 118 and a transmission permission determining portion 128.

B2. Variation 2

Figure 17:
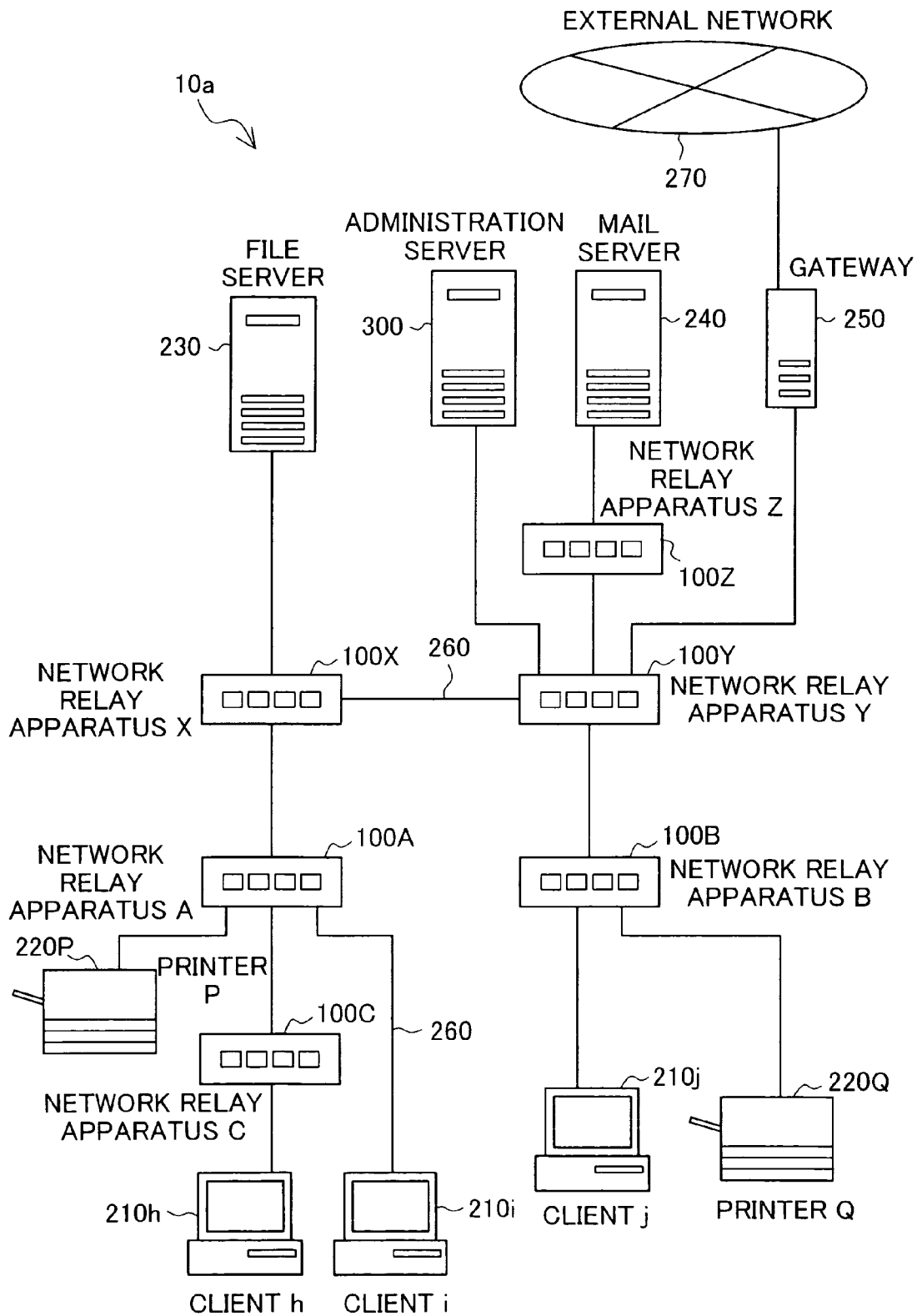
FIG. 17 is a diagram showing a configuration of a network system 10a in another variation.

The configuration of the network system 10 of the above-described embodiment is merely exemplary, and it is possible to employ some other configuration for the network system 10. FIG. 17 is a diagram showing a configuration of a network system 10*a* in another variation. The difference from the network system 10 of the embodiment depicted in FIG. 1 is that in the network system 10*a* of the variation depicted in FIG. 17, a network relay apparatus 100C is situated between the client 210*h* and the network relay apparatus 100A, and a network relay apparatus 100Z is situated between the mail server 240 and the network relay apparatus 100Y.

In the network system 10*a* of the variation, network relay apparatus 100A and network relay apparatus 100C are the network relay apparatus 100 into which all packets originating from the client 210*h* are input. Consequently, there are two connection network relay apparatus for the client 210*h*, namely, network relay apparatus 100A and network relay apparatus 100C. In this case, the login process and logout process described above are performed in either one of the connection network relay apparatus. Thus, it is not always necessary for the connection network relay apparatus for a client 210 to be one hop away from the client 210.

Similarly, network relay apparatus 100Y and network relay apparatus 100Z are the network relay apparatus 100 into which all packets destined for the mail server 240 are input. Consequently, there are two connection network relay apparatus for the mail server 240, namely, network relay apparatus 100Y and network relay apparatus 100Z. In this case, the login process and logout process described above are performed in either one of the connection network relay apparatus. Thus, it is not always necessary for the connection network relay apparatus for a shared device to be one hop away from the shared device.

In the network system 10, the functions of the administration server 300 may instead be included in one or more network relay apparatus 100. Depending on the configuration of the network system 10, in some cases the connection network relay apparatus of a client 210 and the connection network relay apparatus of a shared device may be the same network relay apparatus 100.

B3. Variation 3

In the above-described embodiment, in the permission information 129 (FIG. 3), identifying information and IP address are used to identify transmission origin and transmission destination; however, some other method of identification may be used, depending on the protocol employed for data transmission within the network system 10. For example, transmission origin and transmission destination may be identified using IP addresses only. Alternatively, in addition to identifying information and IP address, port numbers assigned to applications on clients 210 and shared devices could be used for identification purposes.

B4. Variation 4

The particulars of the login process and logout process described above are merely exemplary, with other content being possible instead. For example, in the login process (FIG. 8) of the embodiment, the network relay apparatus 100A assigns an authentication IP address in response to an authentication IP address request from a client 210 (Steps S110 and S120), but it may be acceptable instead for the network relay apparatus 100A to voluntarily assign authentication IP addresses on a periodic basis to the connected client 210. Alternatively, authentication of the user of a client 210 may be carried out without the use of an authentication IP address, as with the method specified in IEEE 802.1x.

During the login process (FIG. 8) of the embodiment, user authentication of clients 210 is carried out (Step S150), but it is not always necessary to perform user authentication during the login process. For example, in the event of a login request from a client 210 (Step S130), updating of the permission information 129 belonging to the connection network relay apparatus for the client 210 and the shared device (Steps S170 and S210) may be accomplished without user authentication being executed in the administration server 300. In this case, there may be no need for the login request to include authentication information.

In the network system 10, it is not necessary for the packet transmission permission determination to be made in the connection network relay apparatus for a particular client 210. For example, in the network system 10, the packet transmission permission determination may be made only in the connection network relay apparatus for the shared device, for the purpose of controlling packet transmission between the shared device and the client 210.

Also, whereas in the embodiment the administration server 300 has administration information 336 (FIG. 4), the connection network relay apparatus for the shared device may have at least some of this administration information 336. For example, in the case where the network relay apparatus 100Y, which is the connection network relay apparatus for the mail server 240, has administration information 336, during the login process (FIG. 8), the transmission of attribute information from the administration server 300 to the network relay apparatus 100Y (Step S200) may not be executed.

Also, during the login process (FIG. 8) of the embodiment, the usage notification (Step S200) includes information identifying the successfully authenticated user and the shared devices which the user has permission to use; however, the usage notification need not include information identifying the shared devices which the user has permission to use. In this case, the network relay apparatus 100 that receives the usage notification (network relay apparatus 100Y in FIG. 8) may query the administration server 300 to identify the devices which the successfully authenticated user has permission to use.

Further, whereas in the embodiment, with regard to permission for packet transfer between a client 210 and a shared device that users belonging to a certain group are granted permission to use by the group information 338 (FIG. 6) as well, settings are made in the connection network relay apparatus for the shared device subsequent to successful user authentication in the administration server 300, permission for packet transfer with a shared device subsequent that users belonging to a certain group are granted permission to use may be established in advance prior to the login process.

What is claimed is:

1. A method for controlling transmission data transferred between a shared device and a target client which commonly exist within a common network having: at least one client, with one of the at least one client being the target client in the common network; multiple shared devices in the common network, where each shared device is a resource device available to provide a client with a predetermined service; multiple network relay apparatuses provided in the common network separated from the target client and the shared device, that connect the target client with the shared device and determine transmission permission in the common network; and an administration device that contains administration information in a form of one or more entries, each entry relating a specific shared device and specific user in the common network and indicating authorized transmission permission to use the specific shared device by the specific user in the common network, the method comprising the steps of:
   (a) user identification information that identifies a user of the target client, being acquired, from the target client, by a client connection relay apparatus that handles inputs of the transmission data originating from the target client;
   (b) the administration device acquiring the user identification information from the client connection relay apparatus;
   (c) the administration device, referring to the user identification information and the administration information, and detecting a target shared device of the multiple shared devices, that is one of the shared devices of which authorized transmission permission to use has been granted to the user of the target client identified based on the acquired user identification information;
   (d) the administration device notifying a shared device connection relay apparatus of the at least one network relay apparatus in the common network, of authorized transmission permission to transfer the transmission data between the target client and the target shared device, together with information identifying the target client, where the shared device connection relay apparatus handles the transmission data destined for the target shared device that is detected in the step (c); and
   (e) the shared device connection relay apparatus, upon receipt of the notification in the step (d), setting the condition so as to change the transmission permission concerning transmission data transfer between the target client and the target shared device from not authorized to authorized, within the shared device connection relay apparatus;
   wherein the client connection relay apparatus is a network relay apparatus separated from each of the target client and the target shared device by at least one link, and the shared device connection relay apparatus is a network relay apparatus separated from each of the target client and the target shared device by at least one link; and
   wherein the client connection relay apparatus is one of the multiple network relay apparatuses and the shared device connection relay apparatus is a different one of the multiple network relay apparatuses.

2. A method according to claim 1, wherein
   the user identification information includes authentication information for use in authenticating a user of the target client,
   the method further comprises the step of: (f) the administration device performing authentication of a user of the target client based on the authentication information, and
   the step (d) is executed only when the authentication in the step (f) is successful.

3. A method according to claim 2, further comprising the steps of:
   (g) in the event of successful authentication in the step (f), the administration device notifying the client connection relay apparatus of success of the authentication; and
   (h) upon receiving notification in the step (g), the client connection relay apparatus setting the condition so as to change from not authorized to authorized, the transmission permission for data sent from the target client, within the client connection relay apparatus.

4. A method according to claim 3, further comprising the steps of:
   (i) the client connection relay apparatus detecting suspension of use of the network by a user of the target client, and notifying the administration device of the suspension of use;
   (j) the administration device, upon receipt of notification in the step (i), notifying the shared device connection relay apparatus of the suspension of use; and
   (k) the shared device connection relay apparatus, upon receipt of notification in the step (j), setting the condition so as to change from authorized to not authorized the transmission permission for transmitting data between the target client and the target shared device, within the shared device connection relay apparatus.

5. A method according to claim 4, further comprising the step of:
   (l) upon detection of the suspension of use, the client connection relay apparatus setting the condition so as to change from authorized to not authorized, the transmission permission for transmitting data sent from the target client, within the client connection relay apparatus.

6. A method according to claim 4, wherein
   the step (i) is a step wherein the client connection relay apparatus detects the suspension of use in at least one instance selected from: receipt from the target client of a request for suspending use of the network; and failure to receive within a prescribed time interval from the target client, a request for continued use of the network.

7. A method according to claim 2, wherein
   the client connection relay apparatus is the network relay apparatus which is one link away from the target client, and
   the shared device connection relay apparatus is the network relay apparatus which is one link away from the target shared device.

8. A method according to claim 1, wherein each network relay apparatus is adapted to relay the data by inputting the data from a source side, and outputting the data from a target side toward a target device.

9. A method according to claim 1, wherein each network relay apparatus is one of a switching hub, a router and an access point.

10. A method according to claim 1, wherein the shared device connection relay apparatus is separated from the client connection relay apparatus by at least one link.

11. An administration device for use in a common network, the common network having: at least one client in the common network;
multiple shared devices in the common network, where each shared device is a resource device available to provide a client with a predetermined service; and multiple network relay apparatuses provided in the common network separated from the target client and the shared device, that connect a target client with a shared device in the common network and determine transmission permission in the common network, the administration device comprising:
an administration information establishing device configured to establish, in accordance with an instruction from an administrator, administration information in a form of one or more entries, each entry relating a specific shared device and specific user in the common network and indicating authorized transmission permission to use the specific shared device by the specific user in the common network;
a user identification information acquiring module in the common network, which is configured to acquire, from a client connection relay apparatus that handles inputs of the transmission data originating from the target client, user identification information identifying a user of the target client; and
a transmission permission management module in the common network, which is configured to (i) detect, referring to the user identification information and the administration information, a target shared device that is one of the multiple shared devices of which authorized transmission permission to use has been granted to the user of the target client identified based on the acquired user identification information, and (ii) notify a shared device connection relay apparatus of authorized permission to transfer the transmission data between the target client and the target shared device in the common network, together with information identifying the target client, where the shared device connection relay apparatus handles the transmission data destined for the target shared device that is detected in item (i);
wherein the client connection relay apparatus is a network relay apparatus separated from each of the target client and the target shared device by at least one link, and the shared device connection relay apparatus is a network relay apparatus separated from each of the target client and the target shared device by at least one link; and
wherein the client connection relay apparatus is one of the multiple network relay apparatuses and the shared device connection relay apparatus is a different one of the multiple network relay apparatuses.

12. An administration device according to claim 11, wherein each network relay apparatus is adapted to relay the data by inputting the data from a source side, and outputting the data from a target side toward a target device.

13. An administration device according to claim 11, wherein each network relay apparatus is one of a switching hub, a router and an access point.

14. An administration device according to claim 11, wherein the shared device connection relay apparatus is separated from the client connection relay apparatus by at least one link.

15. A pair of network relay apparatuses for use in a common network, to connect a target client and a shared device, the pair of network relay apparatuses being provided separated from the target client and the shared device on the common network, the common network having: at least one client in the common network including the target client; multiple shared devices in the common network including the shared device, where each shared device is a resource device available to provide a client with a predetermined service; and an administration device that contains administration information in a form of one or more entries, each entry relating a specific shared device and specific user in the common network and indicating authorized transmission permission to use the specific shared device by the specific user in the common network, the network relay apparatus comprising:
a first network relay apparatus of the pair of network relay apparatuses, including a user identification information processing module that handles inputs of the transmission data originating from the target client and is configured to acquire, from the target client, user identification information identifying a user of the target client and to send the user identification information to the administration device; and
a second network relay apparatus of the pair of network relay apparatuses, including a transmission permission management module configured to set a condition, upon receiving from the administration device authorized transmission permission for data transfer between the target client and the target shared device in the common network, together with information identifying the target client, so as to change the data transmission permission concerning transmission data transfer between the target client and the target shared device from not authorized to authorized, within the second network relay apparatus;
wherein the first network relay apparatus and the second network relay apparatus, is separated from each of the target client and the target shared device by at least one link; and
wherein the first network relay apparatus and the second network relay apparatus are separate multiple network relay apparatuses from each other.

16. A network relay apparatus according to claim 15, wherein the network relay apparatus is adapted to relay the data by inputting the data from a source side, and outputting the data from a target side toward a target device.

17. A network relay apparatus according to claim 15, wherein each of the first network relay apparatus and the second network relay apparatus, is one of a switching hub, a router and an access point.

18. A network relay apparatus according to claim 15, wherein the first network relay apparatus is separated from the second network relay apparatus by at least one link.

* * * * *